(12) United States Patent
Kabbani

(10) Patent No.: US 9,363,584 B1
(45) Date of Patent: Jun. 7, 2016

(54) DISTRIBUTING LINK CUTS BETWEEN SWITCHES IN A NETWORK

(71) Applicant: GOOGLE INC., Mountain View, CA (US)

(72) Inventor: Abdul Kabbani, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 117 days.

(21) Appl. No.: 14/217,950

(22) Filed: Mar. 18, 2014

Related U.S. Application Data

(60) Provisional application No. 61/934,474, filed on Jan. 31, 2014.

(51) Int. Cl.
| | |
|---|---|
| *H04J 14/00* | (2006.01) |
| *H04Q 11/00* | (2006.01) |
| *H04L 12/24* | (2006.01) |
| *H04B 10/27* | (2013.01) |

(52) U.S. Cl.
CPC ........... *H04Q 11/0005* (2013.01); *H04B 10/27* (2013.01); *H04L 41/12* (2013.01); *H04Q 11/0062* (2013.01); *H04Q 11/0071* (2013.01)

(58) Field of Classification Search
CPC ...................... H04Q 11/0001–11/0071; H04Q 2011/0037–2011/0054
USPC .................................................... 398/45–103
See application file for complete search history.

(56) References Cited

U.S. PATENT DOCUMENTS

| | | | | |
|---|---|---|---|---|
| 8,490,072 B2* | 7/2013 | Andrade | .................. | G06F 8/433 717/132 |
| 8,745,264 B1* | 6/2014 | Marr | ....................... | H04L 67/42 709/235 |
| 8,942,232 B1* | 1/2015 | Fermor | ................... | H04L 49/15 370/388 |
| 2011/0029982 A1* | 2/2011 | Zhang | ................... | H04L 47/125 718/105 |
| 2011/0267954 A1* | 11/2011 | Seetharaman | ........ | H04L 43/026 370/241 |
| 2013/0242983 A1* | 9/2013 | Tripathi | .................. | H04L 49/25 370/355 |
| 2014/0258479 A1* | 9/2014 | Tenginakai | ........... | H04L 41/082 709/220 |
| 2014/0280521 A1* | 9/2014 | Marr | ....................... | H04L 67/42 709/203 |
| 2015/0016277 A1* | 1/2015 | Smith | .................. | H04L 41/0686 370/244 |
| 2015/0030034 A1* | 1/2015 | Bogdanski | .............. | H04L 49/25 370/401 |
| 2015/0043905 A1* | 2/2015 | Graves | ............... | H04Q 11/0005 398/25 |

OTHER PUBLICATIONS

Farrington, et al, "Helios: A Hybrid Electrical/Optical Switch Architecture for Modular Data Centers", SIGCOMM'10, Aug. 30-Sep. 3, 2010, 12 pages.

Wayne, "Max Flo, Min Cut", Algorithms and Data Structures, COS 226, Princeton University, Spring 2004, 12 pages.

\* cited by examiner

*Primary Examiner* — Li Liu

(74) *Attorney, Agent, or Firm* — Edward A. Gordon; Foley & Lardner LLP

(57) ABSTRACT

A non-transitory computer-readable storage medium may include instructions stored thereon that. When executed by at least one processor, the instructions may be configured to cause a computing system to at least determine which links connecting old super blocks to old spine blocks via a plurality of Optical Circuit Switches (OCSs) in a network to disconnect to accommodate at least one new super block and at least one new spine block being added to a switching network, the determining including determining a maximum of m links per OCS to disconnect, connect the old super blocks to the at least one new spine block via the OCSs associated with the links to be disconnected, and connect the at least one new super block to the old spine blocks via the OCSs associated with the links to be disconnected.

20 Claims, 19 Drawing Sheets

Delta Matrix 306

|  | Column[0] | Column[1] | Column[2] | Column[3] | Column[4] |
|---|---|---|---|---|---|
| Row[0] | 6 | 6 | 7 | 7 | -26 |
| Row[1] | 6 | 6 | 6 | 7 | -25 |
| Row[2] | 7 | 6 | 6 | 6 | -25 |
| Row[3] | 7 | 7 | 6 | 6 | -26 |
| Row[4] | -26 | -25 | -25 | -26 | 0 |

FIG. 3C

Current Matrix 352

|  | Column[0] | Column[1] | Column[2] | Column[3] |
|---|---|---|---|---|
| Row[0] | 1 | 1 | 1 | 1 |
| Row[1] | 1 | 1 | 1 | 1 |
| Row[2] | 1 | 1 | 1 | 1 |
| Row[3] | 1 | 1 | 1 | 1 |

FIG. 3D

Next Matrix 354

|  | Column[0] | Column[1] | Column[2] | Column[3] | Column[4] |
|---|---|---|---|---|---|
| Row[0] | 0 | 1 | 1 | 1 | 1 |
| Row[1] | 1 | 0 | 1 | 1 | 1 |
| Row[2] | 1 | 1 | 0 | 1 | 1 |
| Row[3] | 1 | 1 | 1 | 0 | 1 |
| Row[4] | 1 | 1 | 1 | 1 | 0 |

FIG. 3E

Delta Matrix 356

|  | Column[0] | Column[1] | Column[2] | Column[3] | Column[4] |
|---|---|---|---|---|---|
| Row[0] | 1 | 0 | 0 | 0 | -1 |
| Row[1] | 0 | 1 | 0 | 0 | -1 |
| Row[2] | 0 | 0 | 1 | 0 | -1 |
| Row[3] | 0 | 0 | 0 | 1 | -1 |
| Row[4] | -1 | -1 | -1 | -1 | 0 |

FIG. 3F

Current Matrix 342

| | Column[0] | Column[1] | Column[2] | Column[3] |
|---|---|---|---|---|
| Row[0] | 1 | 0 | 0 | 0 |
| Row[1] | 0 | 1 | 0 | 0 |
| Row[2] | 0 | 0 | 0 | 1 |
| Row[3] | 0 | 0 | 1 | 0 |

FIG. 3G

Current Matrix 344

| | Column[0] | Column[1] | Column[2] | Column[3] |
|---|---|---|---|---|
| Row[0] | 0 | 0 | 0 | 1 |
| Row[1] | 0 | 0 | 1 | 0 |
| Row[2] | 1 | 0 | 0 | 0 |
| Row[3] | 0 | 1 | 0 | 0 |

FIG. 3H

Current
Matrix
346

|  | Column[0] | Column[1] | Column[2] | Column[3] |
|---|---|---|---|---|
| Row[0] | 0 | 1 | 0 | 0 |
| Row[1] | 1 | 0 | 0 | 0 |
| Row[2] | 0 | 0 | 1 | 0 |
| Row[3] | 0 | 0 | 0 | 1 |

FIG. 3I

Current
Matrix
348

|  | Column[0] | Column[1] | Column[2] | Column[3] |
|---|---|---|---|---|
| Row[0] | 0 | 0 | 1 | 0 |
| Row[1] | 0 | 0 | 0 | 1 |
| Row[2] | 0 | 1 | 0 | 0 |
| Row[3] | 1 | 0 | 0 | 0 |

FIG. 3J

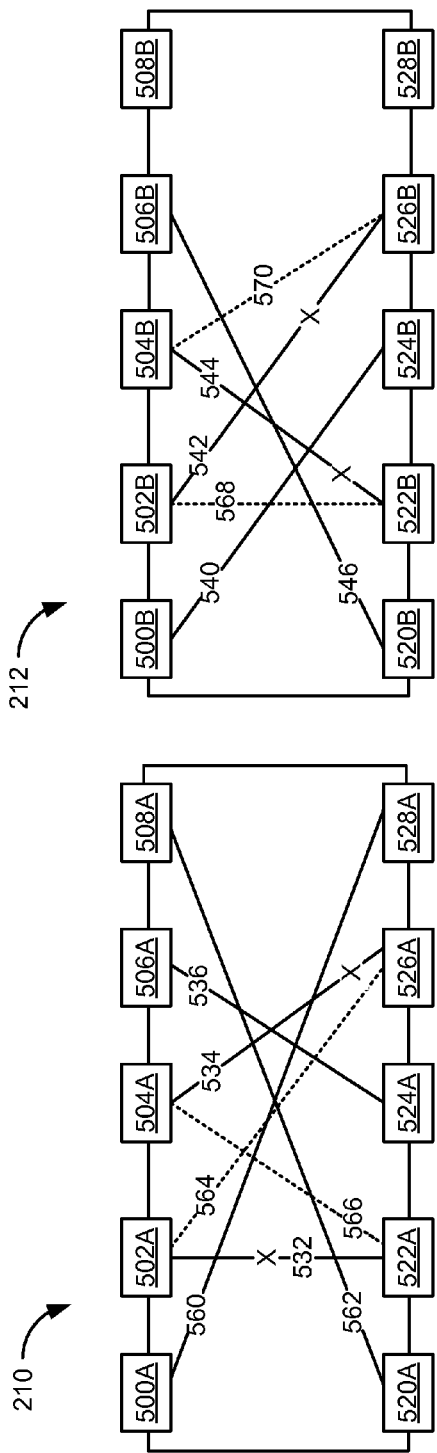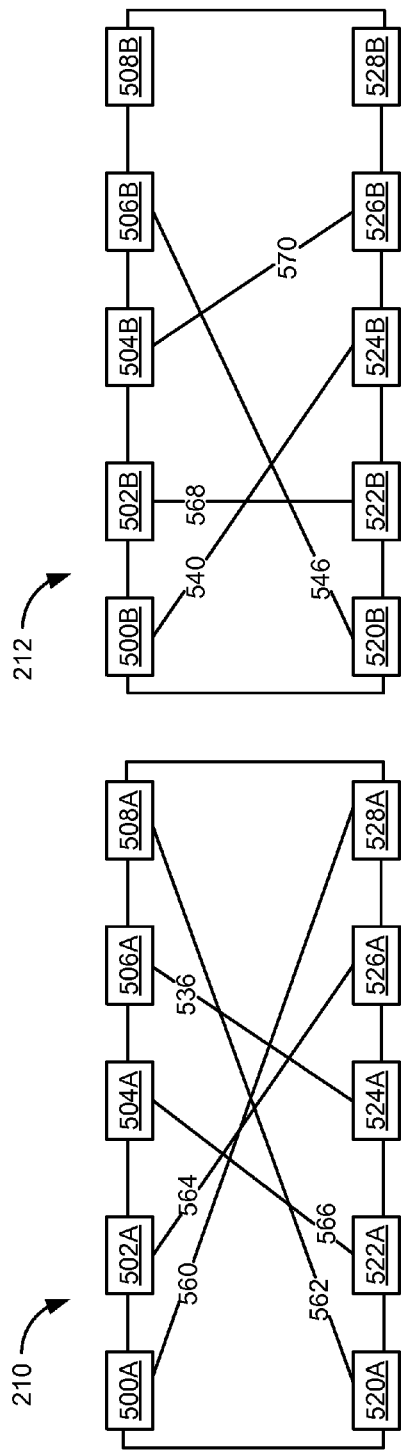
FIG. 5E
FIG. 5F

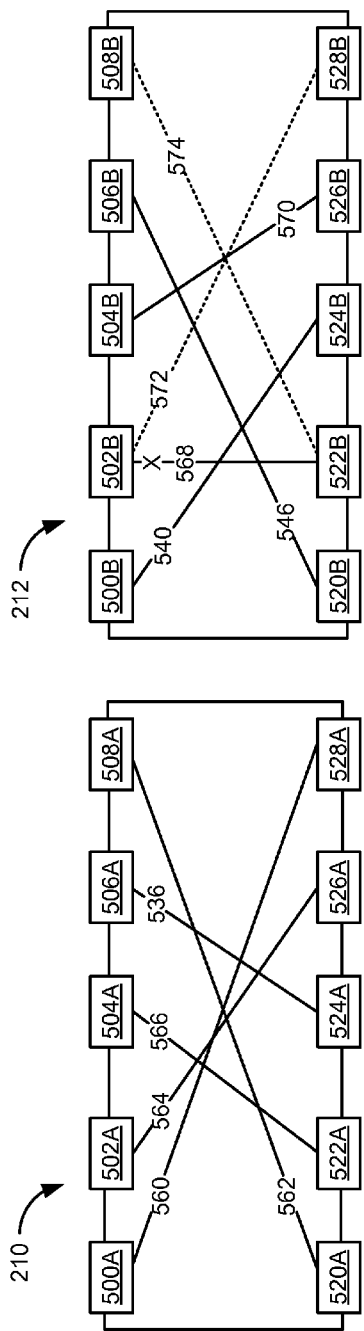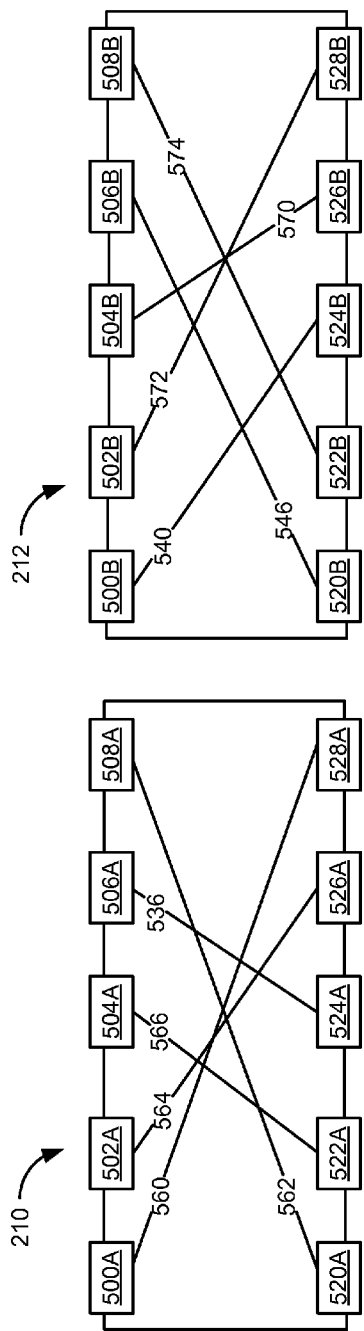
FIG. 5G
FIG. 5H

DISTRIBUTING LINK CUTS BETWEEN SWITCHES IN A NETWORK

PRIORITY CLAIM

This Application claims priority to U.S. Provisional Application No. 61/934,474, filed on Jan. 31, 2014, entitled, "Distributing Link Cuts Between Switches In a Network," the disclosure of which is hereby incorporated by reference.

TECHNICAL FIELD

This description relates to networks with switches.

BACKGROUND

Routing or switching systems may route data between computing devices. When new computing devices are added to the system, some links between computing devices may be cut or disconnected to accommodate adding new links to the new computing devices. The time between cutting old links and adding new links may result in loss of data.

SUMMARY

According to one general aspect, a non-transitory computer-readable storage medium may include instructions stored thereon that, when executed by at least one processor, the instructions may be configured to cause a computing system to at least determine which links connecting old super blocks to old spine blocks via a plurality of Optical Circuit Switches (OCSs) in a network to disconnect to accommodate at least one new super block and at least one new spine block being added to a switching network, the determining including determining a maximum of m links per OCS to disconnect, connect the old super blocks to the at least one new spine block via the OCSs associated with the links to be disconnected, and connect the at least one new super block to the old spine blocks via the OCSs associated with the links to be disconnected.

According to one general aspect, a non-transitory computer-readable storage medium may include instructions stored thereon that. When executed by at least one processor, the instructions may be configured to cause a computing system to at least determine a set of old links between old super blocks and old spine blocks to be disconnected to accommodate new links between the old super blocks and a new spine block and between the old spine blocks and a new super block, the links being routed through switches; distribute the old links to be disconnected by assigning the old links to be disconnected to the switches with a maximum of m disconnected links per switch; disconnect the determined old links at the assigned switches; and connect the new links between the old super blocks and the new spine block and between the old spine block and the new super block through the switches to which the disconnected old links were assigned.

According to one general aspect, a non-transitory computer-readable storage medium may include instructions stored thereon that. When executed by at least one processor, the instructions may be configured to cause a computing system to at least determine that a set of old links, between old spine blocks and old super blocks to be disconnected to accommodate new links between the old super blocks and a new spine block and between the old spine block and a new super block, includes a first old link through a first switch and a second old link through the first switch, determine a second switch that does not include any links from the set of old links, swap the first old link from the first switch to the second switch for a third old link at the second switch that will not be disconnected to accommodate the new links between the old super blocks and the new spine block and between the old spine block and the new super block, disconnect the first old link and the second old link, and connect the new links between the old super blocks and the new spine block and between the old spine block and the new super block through the first switch and the second switch.

According to one general aspect, a non-transitory computer-readable storage medium may include instructions stored thereon that. When executed by at least one processor, the instructions may be configured to cause a computing system to at least perform a maximum flow minimum cut algorithm on a graph, the graph representing switches and links between multiple old super blocks and multiple old spine blocks, the links being routed through the multiple switches, to determine whether a lower bound of disconnected links is achievable while linking at least one new super block to the old spine blocks and linking at least one new spine block to the old super blocks; if the lower bound is achievable, disconnect only links to old super blocks and old spine blocks that will be connected to the at least one new spine block or the at least one new super blocks; if the lower bound is achievable, link the at least one new super block and the at least one new spine block through the switches which incurred the disconnected links; and if the lower bound is not achievable, reshuffle links between switches in which new links will be added and switches in which new links will not be added.

The details of one or more implementations are set forth in the accompanying drawings and the description below. Other features will be apparent from the description and drawings, and from the claims.

BRIEF DESCRIPTION OF THE DRAWINGS

FIG. 3C shows a delta matrix according to an example implementation.

FIG. 3D shows a current matrix of a network according to an example implementation with four switches.

FIG. 3E shows a next matrix of the network according to the example implementation shown in FIG. 3D.

FIG. 3F shows a delta matrix of the network according to the example implementation shown in FIGS. 3D and 3E.

FIG. 3G shows a current matrix of a switch according to the example implementation shown in FIG. 3D.

FIG. 3H shows a current matrix of a second switch according to the example implementation shown in FIG. 3D.

FIG. 3I shows a current matrix of a third switch according to the example implementation shown in FIG. 3D.

FIG. 3J shows a current matrix of a fourth switch according to the example implementation shown in FIG. 3D.

FIGS. 5A through 5H show stages of cutting and adding links to add links to new blocks according to an example implementation.

DETAILED DESCRIPTION

Figure 1:
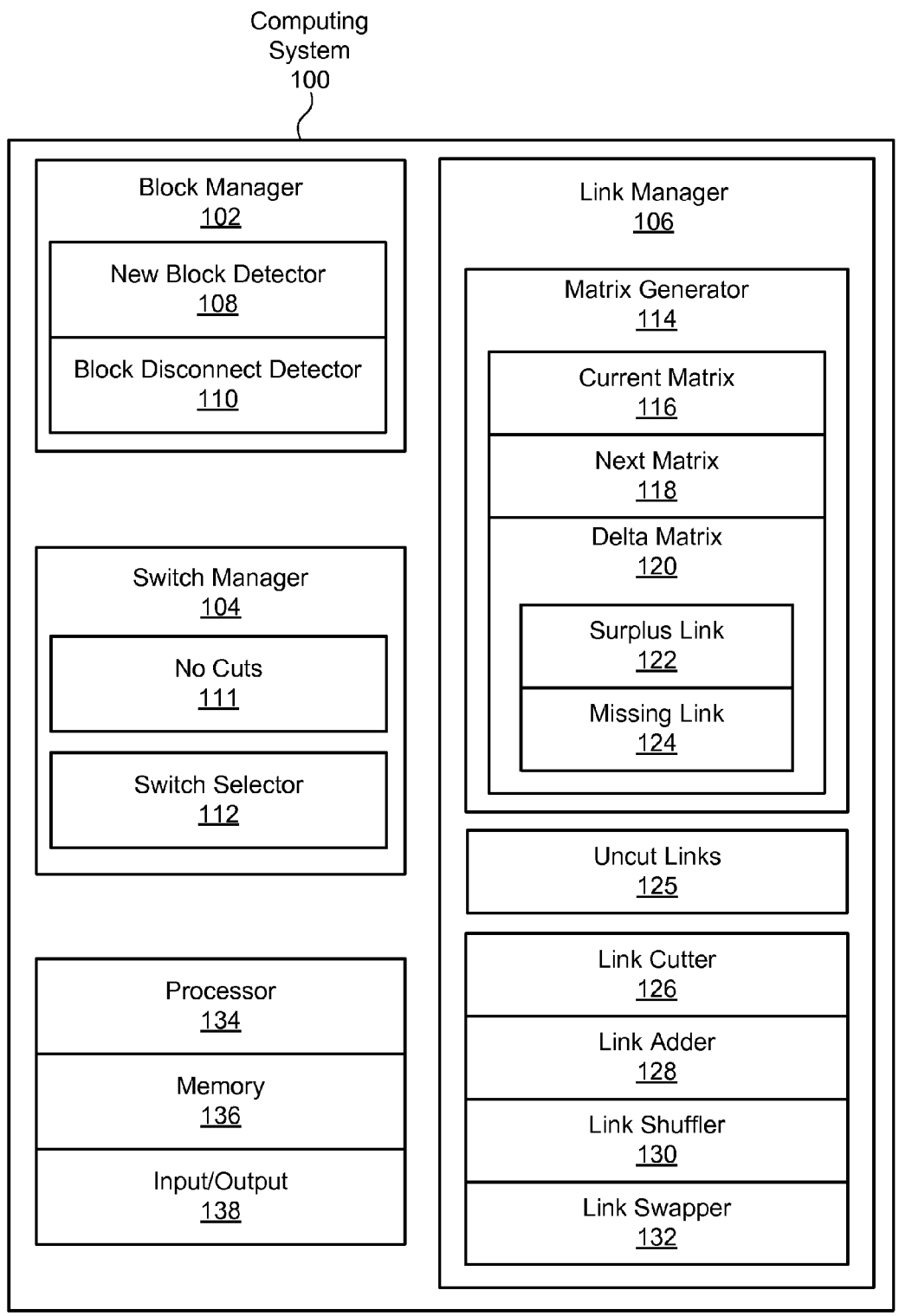
FIG. 1 is a diagram of a computing system for adding blocks while minimizing a number of links to be reconfigured according to an example implementation.

FIG. 1 is a diagram of a computing system 100 for adding blocks while minimizing a number of links to be reconfigured according to an example implementation. The blocks may include super blocks (not shown in FIG. 1), which may represent computing systems such as servers, and spine blocks (not shown in FIG. 1), which may represent computing systems that route data between the super blocks. The super blocks may be coupled to the spine blocks via switches (not shown in FIG. 1). The switches may be circuit switches, with a specified number (such as one) of input ports and a specified number (such as one) of output ports, and may require a dedicated path between an input port associated with a block and an output port associated with another block. The super blocks and spine blocks may be either packet switches or circuit switches. The computing system 100 may be included in, and/or distributed through, the switches, and/or may be a separate device that controls the switches. The computing system 100 may control the cutting (or disconnecting) and adding (or connecting) of links within the switches. The computing system 100 may, for example, select links, and switches through which the links are routed, for disconnecting in a manner to minimize the number of links to be cut, and/or the number of switches which will have their links cut, to accommodate new blocks being added to the system and linked to old blocks. The links within the switches may be optical links coupling ports that are connected to blocks, such as in a Hybrid Electrical/Optical Switch Architecture (Helios). The switches may include any type of switch, such as a circuit switch, that may change or reroute connections between external computing devices coupled to the switches, such as via ports. One example of the switches is Optical Circuit Switches (OCSs).

The computing system 100 may select and/or determine links to be disconnected to distribute link disconnections between switches. For example, the computing system 100 may select links to be disconnected so that a maximum of m, such as one, link is disconnected at each switch. The computing system 100 may select the links based on performing a maximum flow minimum cut algorithm on a graph representing the switches and links.

In an example implementation in which the arrangement of the links within the switches will not allow all of the new links to be connected at switches in which old links were disconnected with only one link disconnected per switch, the computing system 100 may rearrange the links between blocks within the switches to accommodate new blocks being added to the system. The computing system 100 may rearrange the links in such a manner as to minimize throughput loss between the blocks. The switches may each be able to link a limited number of super blocks to a same number of spine blocks, and the number of switches may remain the same when a super block and a spine block are added. To link the new (or added) super block to old (or pre-existing or already connected) spine blocks, and to link the new spine block to old super blocks, the switches may cut links between old super blocks and old spine blocks. Cutting the links between old super blocks and old spine blocks may make links available to link and/or couple some of the old super blocks to the new spine block and to link and/or couple some of the old spine blocks to the new super block.

When there are a large number of links to be cut and added, for each link cut between an old super block and an old spine block, two links may be added. The two links may include a link between the old super block and the new spine block, and a link between the old spine block and the new super block. The order of cutting links may be predetermined or random.

After cutting and adding links at a given switch, there may come a point when a new link may not be added because the new link would exceed the number of links that the design allows at either (or both of) the new super block or the new spine block. The excess may result from the new super block or spine block needing more links at the switch than the switch is designed to accommodate. When the computing system 100 determines that adding a new link would result in an excess of links, the computing system 100 may determine that an old link should be moved from a first switch to a second switch. Based on determining that the old link should be moved from the first switch to the second switch, the computing system 100 may instruct the first switch to swap the old link with another old link from the second switch. Swapping the link may reduce throughput loss compared to simply cutting links and then adding links.

The swapping may include swapping and/or moving an old link between a first old super block and a first old spine block from the first switch to the second switch, swapping and/or moving a second link between the first old super block and a second old spine block from the second switch to the first switch, swapping and/or moving a third link between a second old super block and the second old spine block from the first switch to the second switch, and swapping a fourth link between the second old super block and the first old spine block from the second switch to the first switch. Swapping the link from the first switch to the second switch may allow the new links, between the first old super block and the new spine block and between the first old spine block and the new super block, to be added at the second switch, after the old link is cut at the second switch.

The computing system 100 may include a block manager 102 for determining when new blocks are added or old blocks are removed from a system which includes the computing system 100, switches (not shown in FIG. 1), and computing blocks (not shown in FIG. 1), which may include super blocks and/or spine blocks. The adding new blocks to the system or removing old blocks from the system may prompt the computing system 100 to generate instructions to add and/or cut or disconnect links between added blocks, removed blocks, and/or old blocks which were included in the system. The computing system 100 may also include a switch manager 104 for determining which switches to add or remove links from. The switch manager 104 may determine which switches to add links to, or remove links from, to accommodate the adding of new blocks or removing of old blocks. The computing system 100 may also include a link manager 106 for adding and removing links. The link manager 106 may determine links to cut or disconnect, add or connect, shuffle, and/or swap to accommodate new computing blocks being added to the system and/or old computing blocks being removed from the system.

The block manager 102 may detect when new computing blocks, such as superblocks and/or spine blocks, are added, and/or when old computing blocks are disconnected from the system. The block manager 102 may pass information regarding adding and/or disconnecting computing blocks to the switch manager 104 and/or to the link manager 106. The switch manager 104 and/or the link manager 106 may respond to the information by selecting a switch(s) to add links to old and/or new computing blocks, and/or to cut links from new and/or old computing blocks.

The block manager 102 may include a new block detector 108. The new block detector 108 may detect new blocks being added to the system. The new block detector 108 may send a new block message to the switch manager 104 and/or the link manager 106, prompting the switch manager 104 and/or the link manager 106 to add new links to the new blocks. In some circumstances, adding the new links to the new blocks may necessitate cutting old links from old blocks, and/or shuffling or swapping links between switches.

The block manager 102 may include a block disconnect detector 110. The block disconnect detector 110 may detect the disconnection of a block from the system. The block disconnect detector 110 may send a block disconnect message to the switch manager 104 and/or the link manager 106, prompting the switch manager 104 and/or the link manager 106 to cut and/or reassign links.

The switch manager 104 may determine switches for adding links to computing blocks and/or cutting links from computing blocks. The switch manager 104 may include a switch selector 112. The switch selector 112 may select a switch for adding, cutting, shuffling, and/or swapping links.

The switch manager 104 may also include a no cuts engine 111. The no cuts engine may maintain a count of switches that do not need to have any of their links cut to accommodate linking new blocks within the system. The switch selector 112 may select switches for adding, cutting, shuffling, and/or swapping links according to the maximum flow minimum cut algorithm to minimized the number of switches which have links cut.

The link manager 106 may determine current or old links, determine links to be added after a block has been added, and may determine changes to be made (such as link shuffling and/or link swapping) to achieve the final set of links. The link manager 106 may determine surplus links and missing links, and may determine which links should be cut, added, shuffled, and/or swapped.

The link manager 106 may include a matrix generator 114. The matrix generator 114 may generate matrices which indicate and/or store current numbers of links between super blocks and spine blocks, numbers of links between blocks to be achieved to accommodate computing blocks being added and/or removed, and/or a delta or change from the current numbers of links to the number of links to be achieved.

Figure 3A:
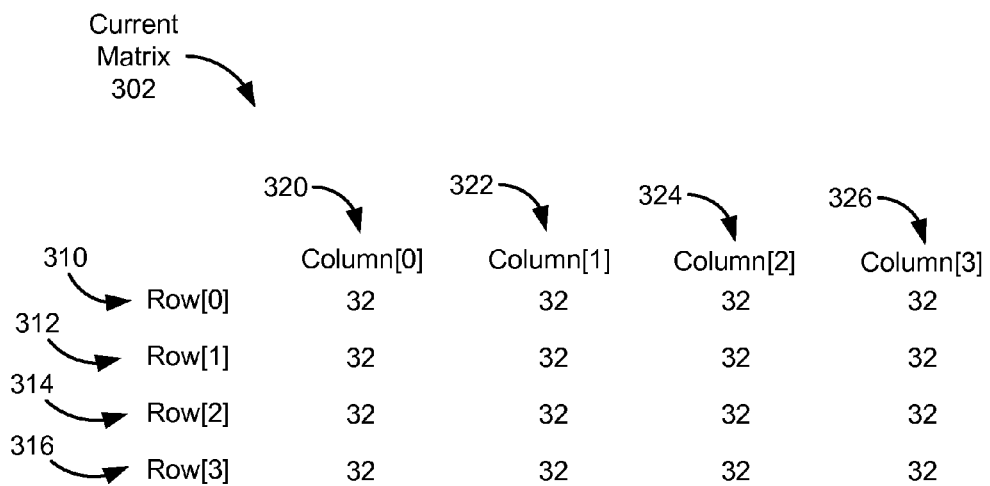
FIG. 3A shows a current matrix according to an example implementation.

The matrix generator 114 may include a current matrix generator 116. The current matrix generator 116 may generate a current matrix showing the number of links between each super block and each spine block. The current matrix may represent numbers of links for the entire system including all of the switches, or numbers of links for a single switch. Examples of current matrices for systems including multiple switches are shown and described with respect to FIGS. 3A and 3D, and examples of current matrices for single switches in the system of FIG. 3D are shown in FIGS. 3G, 3H, 3I, and 3J. The matrix generator 114 may also include a next matrix generator 118. The next matrix generator 118 may generate a next matrix indicating numbers of links between each super block and each spine block to accommodate computing blocks being added and/or removed. Examples of next matrices are shown and described with respect to FIGS. 3B and 3E.

The link manager 106 may also include a delta matrix generator 120. The delta matrix generator 120 may generate a delta matrix which indicates a number of surplus links to be cut and a number of missing links to be added to transition from the current matrix to the next matrix. The delta matrix may represent a difference between the current matrix and the next matrix. The delta matrix generator 120 may include a surplus link determiner 122 for determining a number of surplus links in each block, and a missing link determiner 124 for determining a number of missing links in each block. Examples of delta matrices are shown in FIGS. 3C and 3F.

The link manager 106 may also include an uncut links engine 125. The uncut links engine 125 may maintain a count of uncut links. The count of uncut links may be based on a sum of uncut links within each switch, and may represent a number of old links that may remain uncut and/or may remain connected when old links are cut to accommodate new links for new blocks.

The link manager 106 may also include a link cutter 126. The link cutter 126 may determine links to cut, and/or implement the cutting of the links between computing blocks such as by sending cut instructions to the switch(es). The link manager 106 may also include a link adder 128. The link adder 128 may determine links to add, and/or implement the adding of the link between computing blocks such as by sending add instructions to the switch(es). The link manager 106 may include a link shuffler 130. The link shuffler 130 may shuffle links between switches to facilitate adding links without exceeding link capacities of switches and/or computing blocks. The link shuffling may include cutting and/or adding links. Shuffling links is described further below. The link manager 106 may also include a link swapper 132. The link swapper 132 may swap links between switches to facilitate adding links to new computing blocks. Link swapping may include cutting and/or adding links. Swapping links is described in further detail below.

Figure 2A:
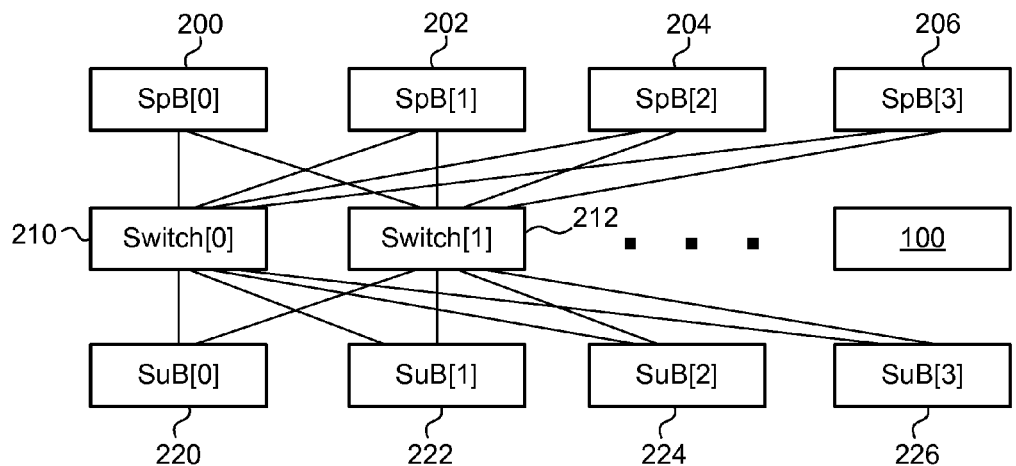
FIG. 2A is a diagram of a system with blocks linked by switches according to an example implementation.

FIG. 2A is a diagram of a system with blocks 200, 202, 204, 206, 220, 222, 224, 226 linked by switches 210, 212 according to an example implementation. In this example, the system may include four super blocks 220, 222, 224, 226. While four super blocks 220, 222, 224, 226 are shown in FIG. 2A, any number of four super blocks 220, 222, 224, 226 may be included in the system. The super blocks 220, 222, 224, 226 may include computing systems, such as servers, within a data center. The super blocks 220, 222, 224, 226 may communicate with each other via spine blocks 200, 202, 204, 206. The spine blocks 200, 202, 204, 206 may serve as routers or switches, routing data between the super blocks 220, 222, 224, 226. The super blocks 220, 222, 224, 226 may be interconnected to each other via the switches 210, 212 and the spine blocks 200, 202, 204, 206. The switches 210, 212 may route data between the super blocks 220, 222, 224, 226 and the spine blocks 200, 202, 204, 206.

The switches 210, 212 may be circuit switches, with a specified number (such as one) of input ports and a specified number (such as one) of output ports, and may require a dedicated path between an input port associated with a block and an output port associated with another block. The switches 210, 210 may include, for example, Optical Circuit Switches (OCSs) within a Hybrid Electrical/Optical Switch Architecture (Helios). The switches 210, 212 may be electrically coupled to each of the computing blocks 200, 202, 204, 206, 220, 222, 224, 226, such as by twisted pair or Ethernet connections. While FIG. 2A shows each switch 210, 212 having one link to each block 200, 202, 204, 206, 220, 222, 224, 226 the switches 210, 212 may have any integer number of links to each block 200, 202, 204, 206, 220, 222, 224, 226.

The switches 210, 212 may internally link a super block 220, 222, 224, 226 to a spine block 200, 202, 204, 206, and/or internally link a spine block 200, 202, 204, 206 to a super block 220, 222, 224, 226, by an optical link. The switches 210, 212 may, for example, rotate and/or shift internal mirrors to change which spine block 200, 202, 204, 206 a given super block 220, 222, 224, 226 is linked to. Rotating and/or shifting internal mirrors may enable the linking and/or coupling of blocks 200, 202, 204, 206, 220, 222, 224, 226 to be changed more quickly than by physically unplugging electrical plugs and plugging the plugs into new electrical ports, reducing throughput loss.

The computing system 100 may control the switches 210, 212 by instructing the switches 210, 212 to add and/or cut links to and/or from the computing blocks 200, 204, 204, 206, 220, 222, 224, 226. The computing system 100 may be a separate device within the system, or the functions and processes described with respect to the computing system 100 may be distributed throughout the switches 210, 212.

While two switches 210, 212 are shown in FIG. 1 for illustrative purposes, the system may include any number of switches 210, 212. Each switch 210, 212 may link a maximum of an integer number, such as L, super blocks 220, 222, 224, 226 to each spine block 200, 202, 204, 206, and the same maximum number L spine blocks 200, 202, 204, 206 to each super block 220, 222, 224, 226. In the example shown in FIG. 2A, L is 1. Each super block 220, 222, 224, 226 may be coupled to each spine block 200, 202, 204, 206 by a maximum of (L*O) links, where O is the number of switches 210, 212 in the system.

FIG. 3A show a current matrix 302 according to an example implementation. The current matrix 302 may have been generated by the current matrix generator 116. The current matrix 302 may indicate the number of links from each super block 220, 222, 224, 226 to each spine block 200, 202, 204, 206.

In the example shown in FIG. 3A, L=128 switches 210, 212 in the system, the system includes four super blocks 220, 222, 224, 226 (as shown in FIG. 2A), and the system includes four spine blocks 200, 202, 204, 206 (as shown in FIG. 2A). In this example, Row[0] 310 shows the number of links between super block[0] 220 and each of the four spine blocks 220, 222, 224, 226; in this example, with 128 switches that each have one link to each super block 200, 202, 204, 206, and one link to each spine block 220, 222, 224, 226, the super block[0] has thirty-two links to spine block[0] (as shown by Column[0] 320), thirty-two links to spine block[1] (as shown by Column [1] 322), thirty-two links to spine block[2] (as shown by Column[2] 324), and thirty-two links to spine block[3] (as shown by Column[3] 326). The other three rows, Row[1] 312, Row[2] 314, and Row[3] 316, show that the other super blocks 222, 224, 226 also have thirty to links to each of the spine blocks 200, 202, 204, 206.

As shown in FIG. 3A, each row 310, 312, 314, 316, which represents links for each super block 220, 222, 224, 226, has a total of 128 (32*4) links. Similarly, each column 320, 322, 324, 326, which represents links for each spine block 200, 202, 204, 206, also has a total of 128 (32*4) links. The 128 links per block 200, 202, 204, 206, 220, 222, 224, 226 represent the maximum number of links per block in the example of 128 switches when each switch can have a maximum of one connection to each block. While the number of blocks may change while blocks are added and/or removed from the system, the number of switches (which may include circuit switches and/or optical circuit switches) may remain the same, such as 128 switches. Other numbers of links for each block may exist in systems which have different numbers of switches and/or different maximum numbers of connections per switch.

Figure 2B:
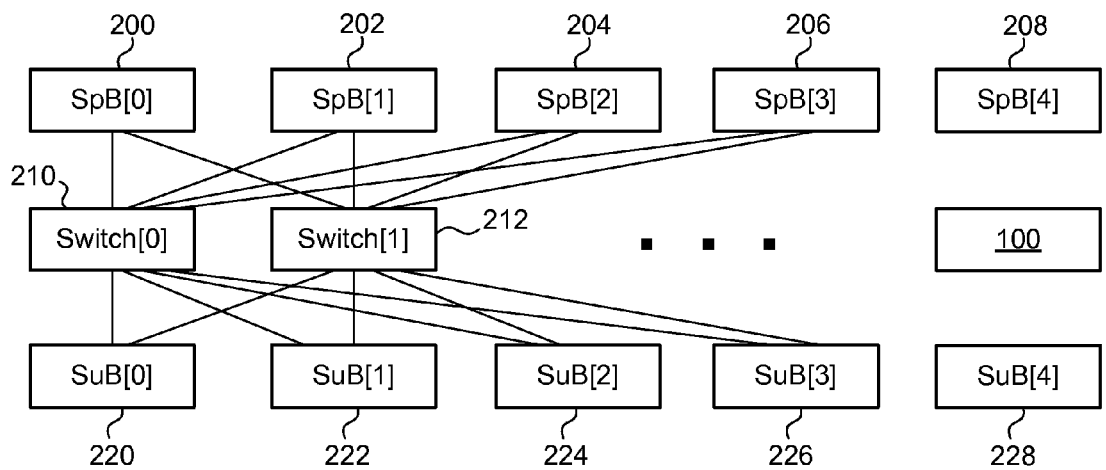
FIG. 2B is a diagram of the system of FIG. 2A with new blocks added according to an example implementation.

FIG. 2B is a diagram of the system of FIG. 2A with new blocks added according to an example implementation. In this example, a new super block, Super Block[4] 228, has been added along with the old super blocks 220, 222, 224, 226, and a new spine block, Spine Block[4] 208, has been added along with the old spine blocks 200, 202, 204, 206. At the initial addition of the Super Block[4] and Spine Block[4], Super Block[4] may not be coupled to any of the switches 210, 212 or any of the spine blocks 200, 202, 204, 206, 208, and the Spine Block[4] may not be coupled to any of the switches 210, 212 or any of the super blocks 220, 222, 224, 226, 228. The next matrix generator 118 of the matrix generator 114 of the link manager 106 of the computing system 100 may determine numbers of links between each of the super blocks 220, 222, 224, 226, 228 and each of the spine blocks 200, 202, 204, 206, 208 after the addition of the Super Block[4] and Spine Block[4] to the system.

In response to the new super block and new spine block being added to the system, the next matrix generator 118 of the matrix generator 114 of the link manager 106 of the computing system 100 may generate a next matrix. The next matrix may represent numbers of links between each of the old super blocks 220, 222, 224, 226 and the new super block 228, and between each of the old spine blocks 200, 202, 204, 206 and the new spine block 208, after the new super block 228 and new spine block 208 have been coupled and/or linked to spine blocks 200, 202, 204, 206, 208 and super blocks 220, 222, 224, 226, 228, respectively.

Figure 3B:
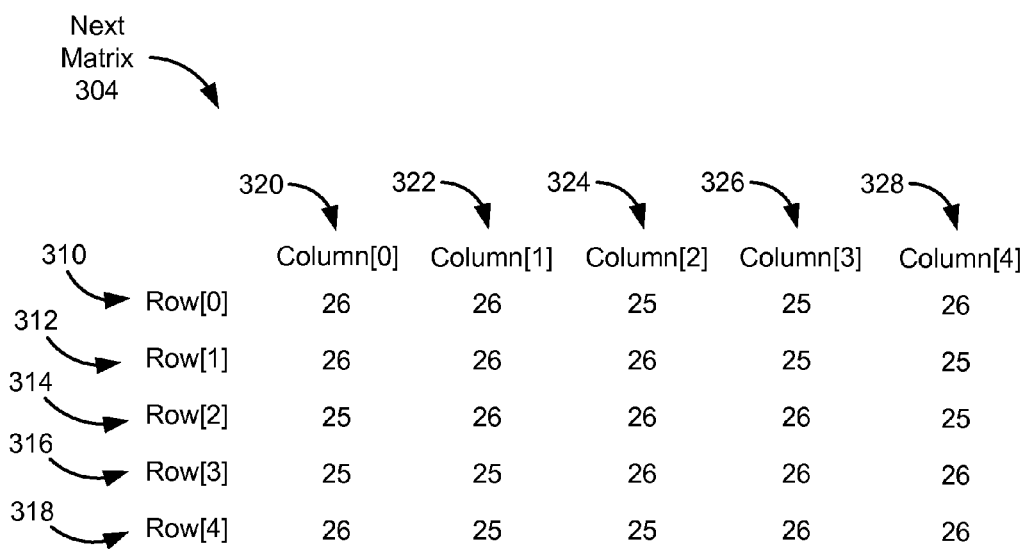
FIG. 3B shows a next matrix according to an example implementation.

FIG. 3B shows a next matrix 304 according to an example implementation. The next matrix 304 indicates numbers of links between each of the super blocks 220, 222, 224, 226, 228 and each of the spine blocks 200, 202, 204, 206, 208. The next matrix includes a new Row[4] 318 representing numbers of spine blocks 200, 202, 204, 206, 208 linked and/or coupled to the new super block 228, and a new Column[4] 328 representing numbers of super blocks 220, 222, 224, 226, 228 coupled to the new spine block 208.

As in the current matrix 302, each row 310, 312, 314, 316, 318 including the new row 318, and each column 320, 322, 324, 326, 328 including the new column 328, has a total of 128 links. The number of links for each computing block 200, 202, 204, 206, 208, 220, 222, 224, 226, 228 remains the same after the new blocks 208, 228 have been incorporated into the system. Because the number of links remains the same, but the number of blocks 200, 202, 204, 206, 208, 220, 222, 224, 226, 228 that each block 200, 202, 204, 206, 208, 220, 222, 224, 226, 228 is linked to has increased, the number of links between each pair of blocks 200, 202, 204, 206, 208, 220, 222, 224, 226, 228 decreases. In the example shown in FIG. 3B, the number of links between each pair of old computing blocks 200, 202, 204, 206, 220, 222, 224, 226 has decreased from thirty-two to either twenty-five or twenty-six. The number of links between the new blocks 208, 228 and the other blocks 200, 202, 204, 206, 208, 220, 222, 224, 226, 228 is also either twenty-five or twenty-six.

To achieve the number of links indicated by the next matrix 304, some of the links between old blocks 200, 202, 204, 206, 220, 222, 224, 226 will be cut and/or disconnected, and links between the new blocks 208, 228 and both old and new blocks 200, 202, 204, 206, 208, 220, 222, 224, 226, 228 will be added. The delta matrix generator 120 of the matrix generator 114 of the link manager 106 of the computing system 100 may generate a delta matrix indicating numbers of links between pairs of old blocks 200, 202, 204, 206, 220, 222, 224, 226 to be cut and numbers of links between the new blocks 208, 228 and the old blocks 200, 202, 204, 206, 220, 222, 224, 226 to be added. The delta matrix may be computed as a difference between the current matrix 302 and the next matrix 304. A surplus link determiner 122 of the delta matrix generator 120 may determine surplus links between the old blocks 200, 202, 204, 206, 220, 222, 224, 226 to be cut. A missing link determiner 124 of the delta matrix generator 120 may determine links between the new blocks 208, 228 and other blocks 200, 202, 204, 206, 208, 220, 222, 224, 226, 228 that are missing and should be added.

FIG. 3C shows a delta matrix 306 according to an example implementation. In this example, the positive numbers at the intersections of Rows[0-3] 312, 314, 316, 318 and Columns [0-3] 320, 322, 324, 326 represent numbers of surplus links between old blocks 200, 202, 204, 206, 220, 222, 224, 226 to be cut. In this example, the negative numbers in Row[4] 318 represent missing links to be added to the new super block 228, and the negative numbers in Column[4] 328 represent missing links to be added to the new spine block 208. This is merely an example. Other numbers of links could be cut and added, and the links to be cut could be represented by negative numbers and links to be added could be represented by positive numbers.

Figure 2C:
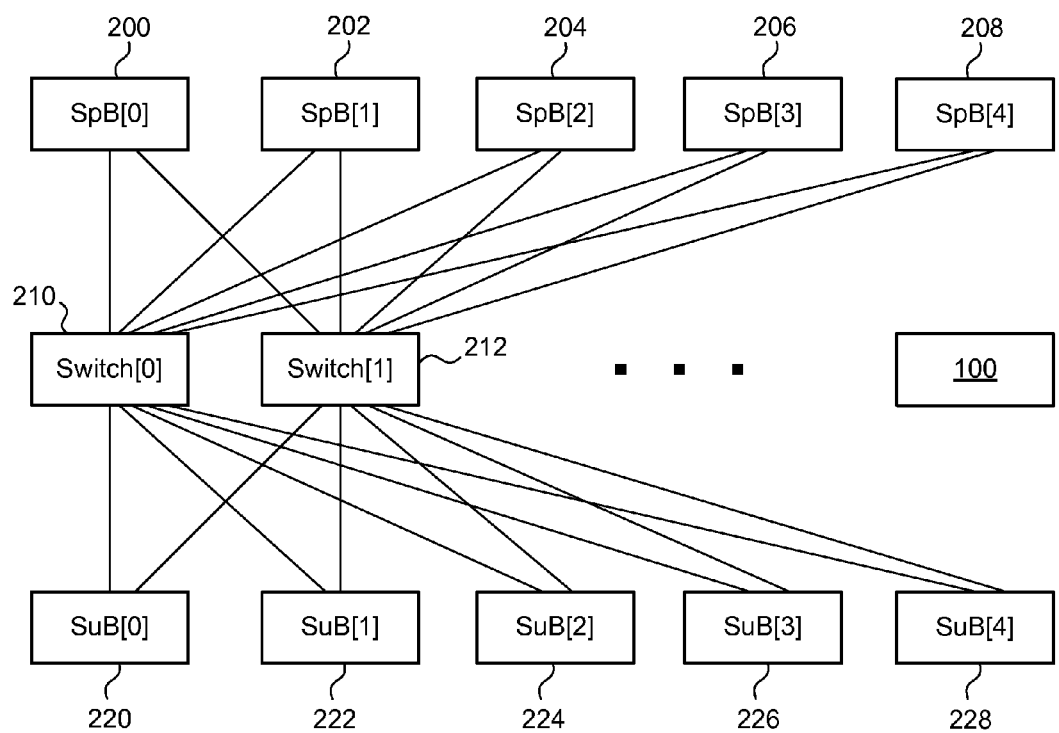
FIG. 2C is a diagram of the system of FIG. 2B with links added to the new blocks according to an example implementation.

FIG. 2C is a diagram of the system of FIG. 2B with links added to the new blocks 208, 228 according to an example implementation. As shown in FIG. 2C, each of the switches 210, 212 is coupled to each of the blocks 200, 202, 204, 206, 208, 220, 222, 224, 226, 228. In an example in which the system includes 128 switches 210, 212, each block 200, 202, 204, 206, 208, 220, 222, 224, 226, 228 will have 128 links to other blocks. FIG. 2C may represent an example configuration in which the numbers of links indicated by the next matrix 304 have been achieved. In an example implementation, numbers of links between each pair of blocks may be represented by the next matrix 304 shown in FIG. 3B.

FIG. 3D shows a current matrix 352 of a network according to an example implementation with four switches. FIGS. 3D through 3J may represent an example network with four old spine blocks 200, 202, 204, 206, two switches 210, 212, four old super blocks 220, 222, 224, 226, one new spine block 208, and one new super block, as shown in FIGS. 2A, 2B, and 2C.

The current matrix 352 shown in FIG. 3D indicates one link between each of the old spine blocks 200, 202, 204, 206 and each of the old super blocks 220, 222, 224, 226. Row[0] 360 indicates that the old super block 220 has one link to each of the old spine blocks old spine blocks 200, 202, 204, 206, Row[1] 362 indicates that the old super block 222 has one link to each of the old spine blocks old spine blocks 200, 202, 204, 206, Row[2] 364 indicates that the old super block 224 has one link to each of the old spine blocks old spine blocks 200, 202, 204, 206, and Row[3] 366 indicates that the old super block 226 has one link to each of the old spine blocks old spine blocks 200, 202, 204, 206. Similarly, Column[0] 370 indicates that the old spine block 200 has one link to each of the old super blocks 220, 222, 224, 226, Column[1] 372 indicates that the old spine block 202 has one link to each of the old super blocks 220, 222, 224, 226, Column[2] 374 indicates that the old spine block 204 has one link to each of the old super blocks 220, 222, 224, 226, and Column[3] 376 indicates that the old spine block 200 has one link to each of the old super blocks 220, 222, 224, 226. The current matrix 352 does not indicate which switches each of the links is routed through. The current matrices 342, 344, 346, 348 shown in FIGS. 3G, 3H, 3I, and 3J indicate which links are routed through which switches 210, 212.

FIG. 3E shows a next matrix of the network according to the example implementation shown in FIG. 3D. The ones in the rectangle bounded by column[0] 370, Row[0] 360, Column[3] 367, and Row[3] 366 represent links that may be maintained, either by not being cut or being shuffled, and the zeroes in this same rectangle represent links that will be cut. The ones in Row[4] 368 and Column[4] 378 represent new links that will be added.

FIG. 3F shows a delta matrix of the network according to the example implementation shown in FIGS. 3D and 3E. As shown in FIG. 3F, a link between the first old super block 220 and first old spine block 200 may be disconnected to accommodate a new link between the new super block 228 and first old spine block 200 and a new link between the new spine block 208 and the first old super block 200, a link between the second old super block 222 and second old spine block 202 may be disconnected to accommodate a new link between the new super block 228 and second old spine block 202 and a new link between the new spine block 208 and the second old super block 202, a link between the third old super block 224 and third old spine block 204 may be disconnected to accommodate a new link between the new super block 228 and third old spine block 206 and a new link between the new spine block 208 and the third old super block 204, and a link between the fourth old super block 226 and fourth old spine block 206 may be disconnected to accommodate a new link between the new super block 228 and fourth old spine block 206 and a new link between the new spine block 208 and the fourth old super block 206. In this example, the new super block 228 and new spine block 208 may not be linked to each other.

FIG. 3G shows a current matrix of a first switch 210 according to the example implementation shown in FIG. 3D. In this example, the first switch 210 routes the links between the first super block 220 and first spine block 200, between the second super block 222 and second spine block 202, between the third super block 204 and the fourth spine block 206, and between the fourth super block 206 and third spine block 204.

FIG. 3H shows a current matrix of the second switch 212 according to the example implementation shown in FIG. 3D. In this example, the second switch 212 routes the links between the first super block 220 and the fourth spine block 206, between the second super block 222 and the third spine block 204, between the third super block 224 and the first spine block 220, and between the fourth super block 226 and the second spine block 202.

FIG. 3I shows a current matrix of a third switch according to the example implementation shown in FIG. 3D. In this example, the third switch routes the links between the first super block 220 and second spine block 202, between the second super block 22 and first spine block 200, between the third super block 224 and the third spine block 204, and between the fourth super block 226 and the fourth spine block 206.

FIG. 3J shows a current matrix of a fourth switch according to the example implementation shown in FIG. 3D. In this example, the fourth switch routes the links between the first super block 220 and the third spine block 204, between the second super block 222 and the fourth spine block 206, between the third super block 224 and the second spine block 202, and between the fourth super block 226 and the first spine block 200.

Figure 4A:
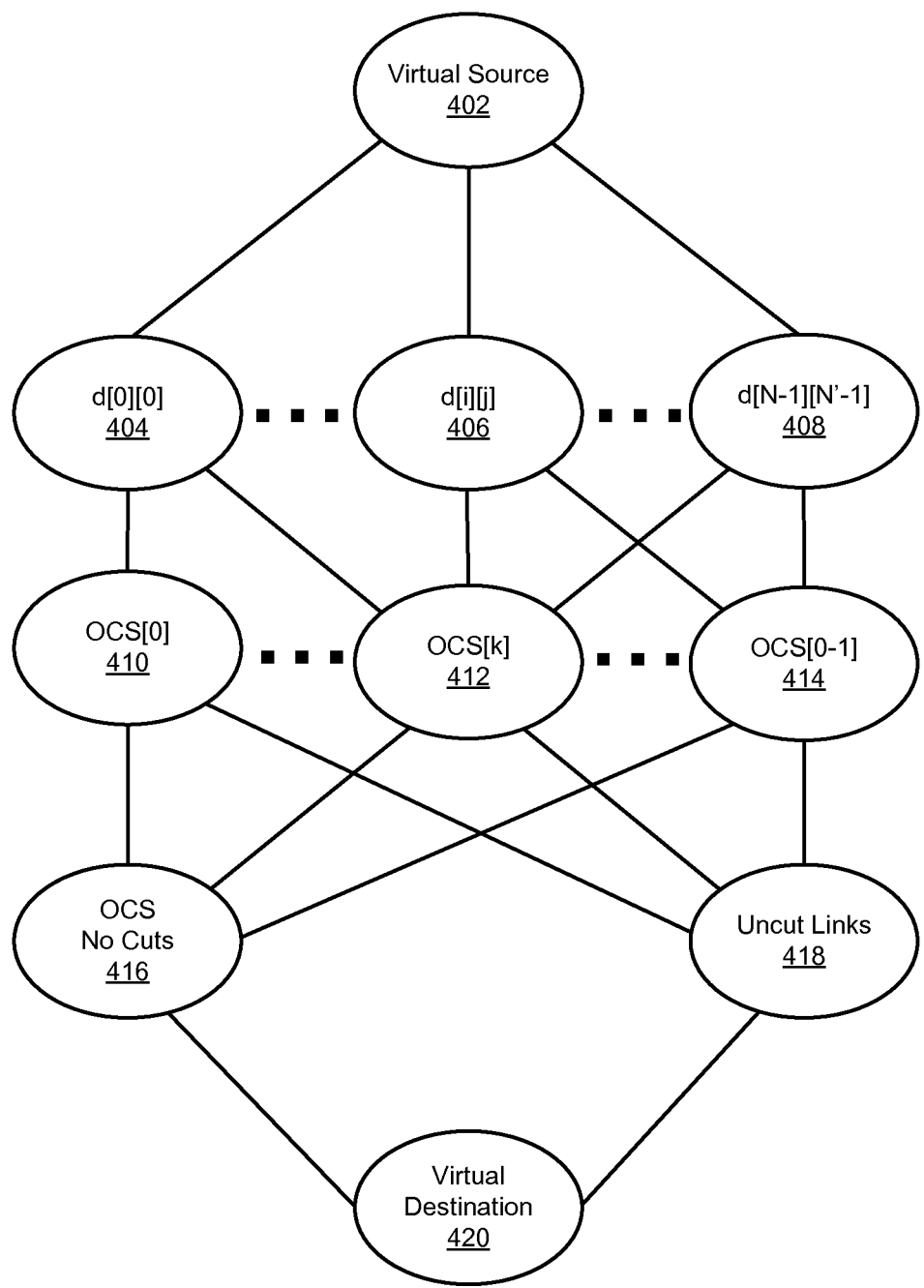
FIG. 4A shows a graph for distributing link cuts within the network according to an example implementation.

FIG. 4A shows a graph for distributing link cuts within the network according to an example implementation. The computing system 100 may perform the maximum flow minimum cut algorithm on this graph to determine whether a lower bound of link cuts is achievable.

The graph may include a virtual source node 402. The virtual source node 402 may be connected to nodes 404, 406, 408 that represent links. The virtual source node 402 may map the nodes 404, 406, 408 to a source and facilitate mapping a count of the links. The link manager 106 may rely on the graph to maximize the number of uninterrupted links.

The graph may also include link nodes 404, 406, 408. While three link nodes are shown in FIG. 4A, the graph may include a number of link nodes equal to either the product of the number of old super blocks and the number of old spine blocks, or the product of the number of old super blocks plus the number of new super blocks and the number of old spine blocks and the number of new spine blocks. The link nodes 404, 406, 408 may correspond to entries in the current matrices 302, 352 shown in FIGS. 3A and 3D. The edges between the virtual source node 402 and the link nodes 404, 406, 408 may be associated with values corresponding to the entries on the next matrix 304.

The graph may also include switch nodes 410, 412, 414. The switch nodes 410, 412, 414 may correspond to switches in the system, such as switches 210, 212. While three switch nodes 410, 412, 414 are shown in FIG. 4A, the graph may include a number of switch nodes equal to the number of switches 210, 212 in the system.

The link nodes 404, 406, 408 may be coupled to switch nodes which route their corresponding links. In the example of FIG. 3A, in which each entry in the current matrix 302 indicates thirty-two links and each switch can accommodate one link per super block 220, 222, 224, 226 or spine block 200, 202, 204, 206, each link node 404, 406, 408 may be coupled to thirty-two switch nodes 410, 412, 414. In the example of FIG. 3B, in which each entry of the next matrix 304 indicates either twenty-five or twenty-six links and each switch can accommodate one link per super block 220, 222, 224, 226 or spine block 200, 202, 204, 206, each link node 404, 406, 408 may be coupled to either twenty-five or twenty-six switch nodes 410, 412, 414.

The edges between the link nodes 404, 406, 408 and the switch nodes 410, 412, 414 may be associated with numbers between zero and the maximum number of links that the switches can accommodate for each super block 220, 222, 224, 226 of spine block 200, 202, 204, 206. In the example in which each switch can accommodate one link per super block 220, 222, 224, 226 and one link per spine block 200, 202, 204, 206, the edges may be associated with either zeroes, indicating that the link will be disconnected to accommodate the new blocks, or a one to indicate that the link will be maintained after the new blocks are added.

The graph may include an OCS no cuts count node 416. The OCS no cuts count node 416 may store a number of OCSs that will not undergo any cuts to accommodate the new blocks. The OCS no cuts node 416 may be managed by the no cuts engine 111. Edges between the OCS nodes 410, 412, 414 may have values of either zero, indicating that the corresponding OCS will undergo a cut and/or have a link routed through the OCS cut or disconnected, or one, indicating that the corresponding OCS will not undergo a cut and/or will not have a link routed through the OCS cut or disconnected.

The graph may include an uncut links node 418. The uncut links node 418 may store a number of links that will not undergo any cuts to accommodate the new blocks. The uncut links node 418 may be managed by the uncut links engine 125. The edges between the OCS nodes 410, 412, 414 and the uncut links nodes 418 may have values between zero and the number of old super blocks 220, 222, 224, 226 and/or old spine blocks 200, 202, 204, 206, and may indicate a number of uncut links at the OCS corresponding to the respective OCS node 410, 412, 414.

The graph may include a virtual destination node 420. The virtual destination node 420 may be coupled to the nodes 416, 418.

The maximum flow minimum cut algorithm may be performed on the graph shown in FIG. 4A to minimize a number of reconfigured links to the system starting from a current matrix 302, 352 to achieve a next matrix 304, 354. A lower bound of link cuts may be $L-|U|=O-|U|$, L represents a number of links per super block or spine block, where U represents the set of links interconnecting the newly added blocks, and O represents the number of switches. If this lower bound is achievable, then $|U|$ OCSs may not incur any link cuts, while the remaining OCS's may incur m, such as one, link cut or disconnection.

In an example implementation, the computing system 100 may achieve the lower bound by cutting a maximum of m, such as one, link from each OCS and connecting its freed ports to the new super block(s) 228 and new spine block (208) while minimizing the number of OCS's that undergo such cuts.

In an example implementation, the lower bound may be achievable if the maximum flow size, and/or the number of uncut links, is equal to:

$$|U|+O*(N-1)$$

$$=$$

$$O*N-(O-|U|)$$

$$=$$

total number of existing links—lower bound on the number on cut links where N is the number of old super blocks 220, 222, 224, 226 and/or old spine blocks 200, 202, 204, 206.

If the lower bound is achievable, then the computing system 100 may cut the switch links represented by those with no flow (those with zeroes at the edges between the link nodes 404, 406, 408 and the OCS nodes 410, 412, 414) and connect the freed and/or disconnected ports at each switch 210, 212 to the new super block 228 and new spine block 208, and may connect the super block ports and spine block ports on the switches that had flow towards the OCS no cuts node 416 and/or the switches 210, 212 for which the edges between their corresponding OCS node 410, 412, 414 and the OCS no cuts node 416 was one. If the lower bound is not achievable, then links may be shuffled between switches, as shown and described with respect to FIGS. 5A through 5H.

The reshuffling may be performed by the switch selector 112 selecting a target that has not incurred any cuts and/or had its links disconnected, and that contains a link to be disconnected (which may be represented by a positive value in the delta matrix 306, 356). The link manager 106 may then swap and/or reshuffle a set of the target switch's links with another set of links from another switch, as shown and described below with respect to FIGS. 5A through 5H.

Figure 4B:
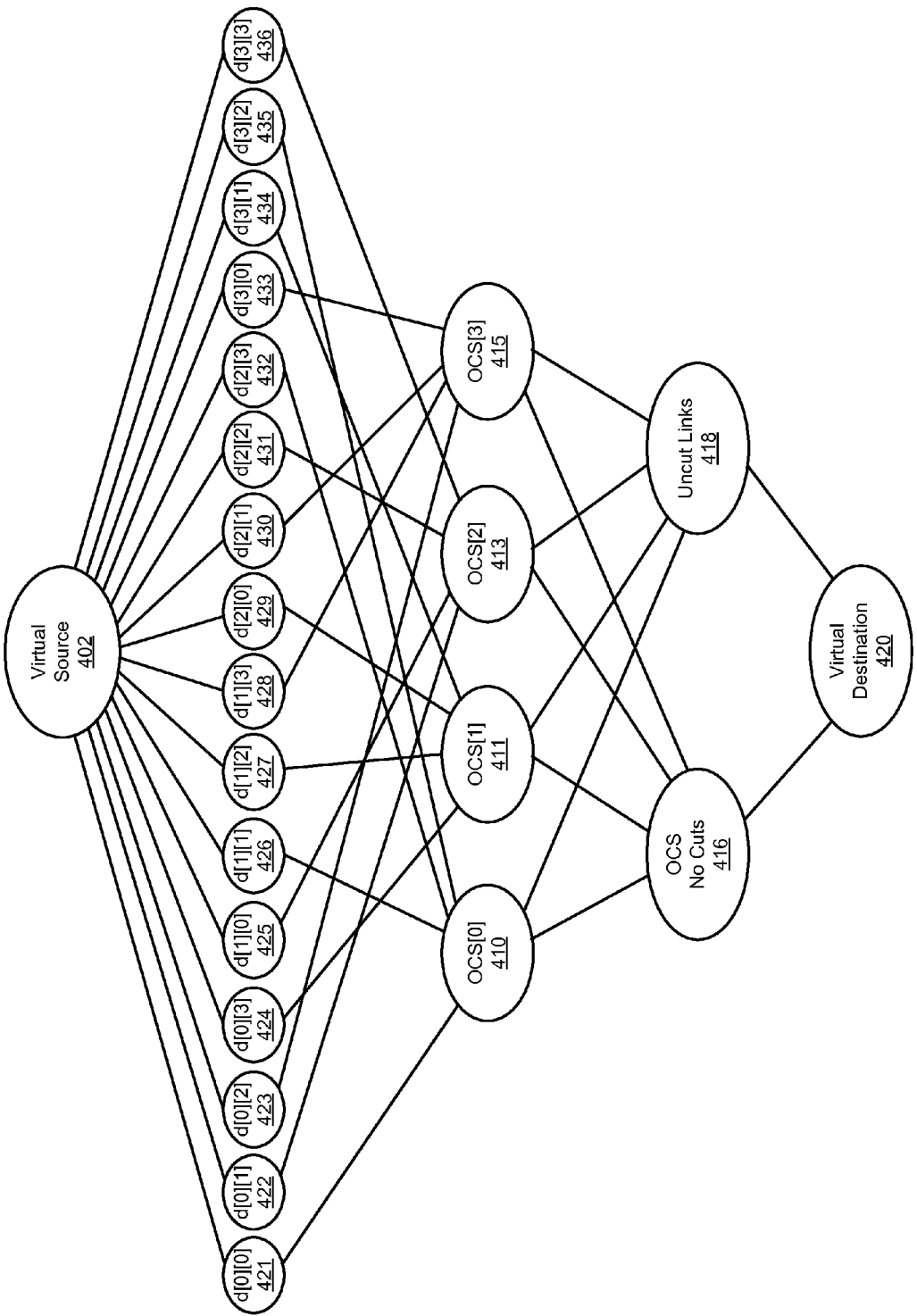
FIG. 4B shows a graph for distributing link cuts within the network according to an example implementation with four switches, four super blocks, and four spine blocks.

FIG. 4B shows a graph for distributing link cuts within the network according to an example implementation with four switches, four super blocks, and four spine blocks. The link nodes 421 through 436 and switch nodes 410, 411, 413, 415 may correspond to the links and switches shown and described with respect to FIGS. 3D through 3J. The link nodes 421 through 436 are shown in row-column notation; for example, link node 421 includes the identifier d[0] [0] to identify the link node 421 as corresponding to the link in Row[0] 360, Column[0] 370, and link node 432 includes the identifier d[2][3] to identify the link node 432 as corresponding the link in Row[2] 364, Column[3] 376.

As shown in FIG. 4B, the link nodes 421, 426, 432, 435 are coupled to the first switch node 410, the link nodes 424, 427, 429, 433 are coupled to the second switch node 411, the link nodes 422, 425, 431, 436 are coupled to the third switch node 413, and the link nodes 423, 428, 430, 433 are coupled to the fourth switch node 415. These couplings correspond to the current matrices 342, 344, 346, 348 shown and described with respect to FIGS. 3G, 3H, 3I, and 3J.

FIGS. 5A through 5H show stages of cutting and adding links to add links to new blocks according to an example implementation. In these examples, the first switch 210 includes ports 520A, 522A, 524A, 526A, 528A coupled to super blocks 220, 222, 224, 226, 228 respectively and ports 500A, 502A, 504A, 506A, 508A coupled to spine blocks 200, 202, 204, 206, 208 respectively (ports 508A, 528A are not shown in FIG. 5A for ease of viewing). Also in these examples, the second switch 212 includes ports 520B, 522B, 524B, 526B, 528B coupled to super blocks 220, 222, 224, 226, 228 respectively and ports 500B, 502B, 504B, 506B, 508B coupled to spine blocks 200, 202, 204, 206, 208 respectively (ports 508B, 528B are not shown in FIG. 5A for ease of viewing). The switches 210, 212 may be circuit switches, with each lower port 520A, 522A, 524A, 526A, 520B, 522B, 524B, 526B coupled to and capable of transmitting and/or receiving data to and/or from only a single upper port 500A, 502A, 504A, 506A, 500B, 502B, 504B, 506B. The upper port 500A, 502A, 504A, 506A, 500B, 502B, 504B, 506B to which each respective lower port 520A, 522A, 524A, 526A, 520B, 522B, 524B, 526B is coupled may be changed and/or reconfigured.

In this example, in the first switch 210, link 530 may correspond to link node 431, link 532 may correspond to link node 426, link 536 may correspond to link node 432, and link 534 may correspond to link node 435. Also in this example, in the second switch, link 546 may correspond to link node 424, link 544 may correspond to link node 427, link 540 may correspond to link node 429, and link 542 may correspond to link node 434.

In an example implementation, link 530, coupling Super Block[0] 220 to Spine Block[0] 200, may be surplus, and link 532, coupling Super Block[1] 222 to Spine Block[1] 202, may be surplus. A desired link configuration may be to cut links 530, 532, and add a link between old super block 220 and new spine block 208 via ports 520A, 508A (not shown in FIG. 5B), add a link between old super block 222 and new spine block 208 via ports 522A, 508A, add a link between old spine block 200 and new super block 528 via ports 500A, 528A (not shown in FIG. 5B), and add a link between old spine block 202 and new super block 228 via ports 502A, 528A.

Figure 5A:
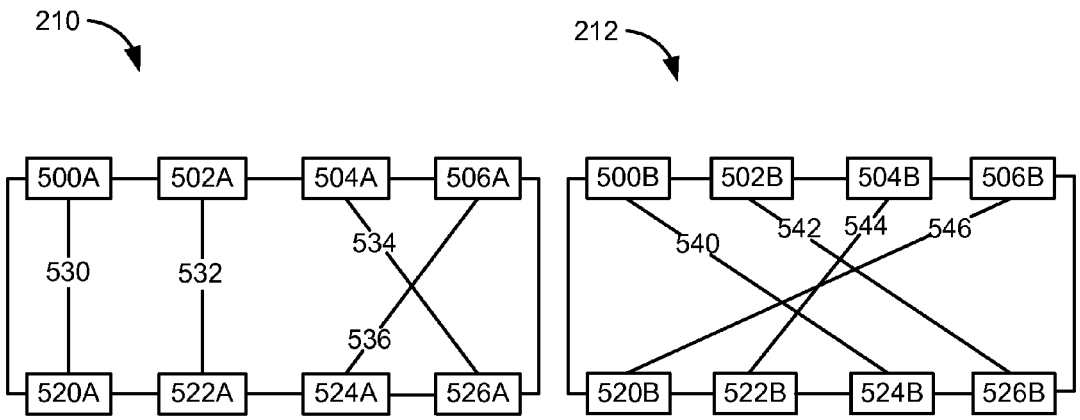
Figure 5B:
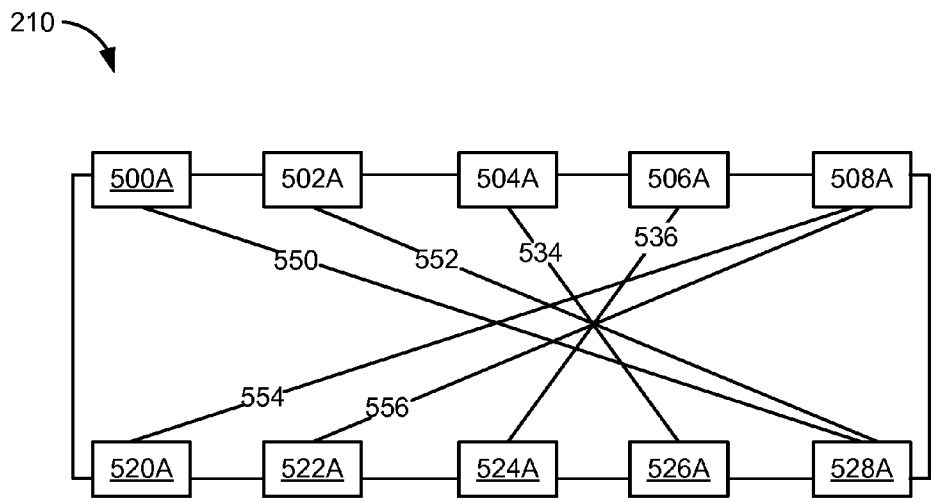

As shown in FIG. 5B, if this link configuration were to be achieved by cutting links 530, 532 in the first switch 210, and adding the links 550, 552, 554, 556 in the first switch, the ports 508A, 528A would impermissibly each be supporting two links.

Figure 5C:
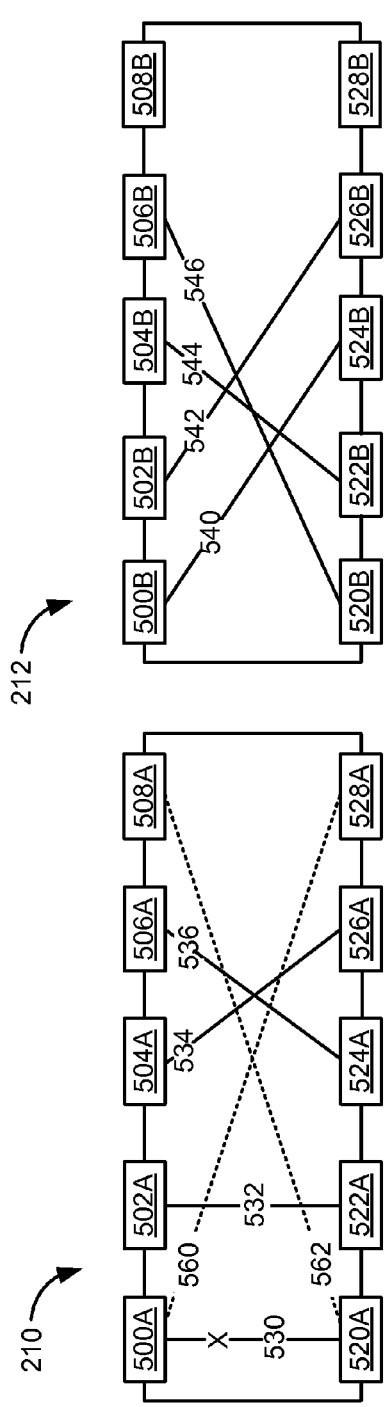

As shown in FIG. 5C, the desired configuration may be achieved by first cutting link 530 between the first old super block 220 and the first old spine block 200, and adding new links 560, 562 between the first old super block 220 and the new spine block 208 and between the first old spine block 200 and the new super block 228. This cutting of link 530 and adding links 560, 562 results in the configuration shown in FIG. 5D.

Figure 5D:
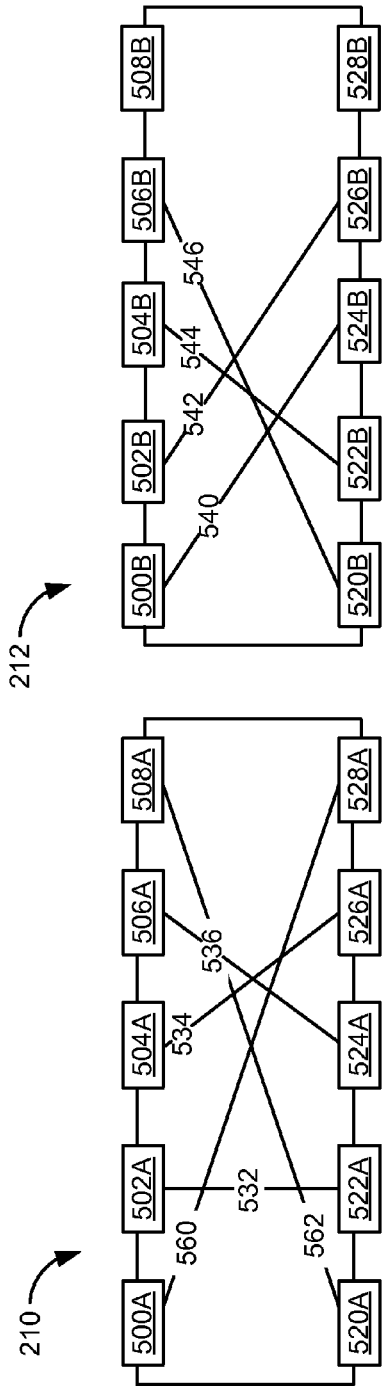

In the configuration shown in FIG. 5D, cutting a first old link 532 between a first old super block 222 and a first old spine block 202 on the first switch 210 at the first switch 210, and replacing the first old link 532 with the first new link 556 (shown in FIG. 5B) between the first old super block 222 and the new spine block 208 and the second new link 552 (shown in FIG. 5B) between the first old super block 202 and the new super block 228 at the first switch 210 would impermissibly result in two links at the new super block 228 and two links at the new spine block 208 at the first switch 210, as shown and described with respect to FIG. 5B. To add links between the first old super block 222 and the new spine block 208 and between the first old super block 202 and the new super block 228, the system and/or first switch 210 may swap and/or shuffle the link 532 to the second switch 212. The system may swap the link 532 from the first switch 210 with a link at the second switch 212. The system may, for example, swap the link 532 with link 542 or link 544 at the second switch 212, and/or swap links 532, 534 at the first switch 210 with links 542, 544 at the second switch 212.

FIG. 5E shows links to be cut and added to swap the link 532 from the first switch 210 to the second switch 212. The swapping and/or shuffling may include cutting the first link 532, cutting a second old link 544 at the second switch 212 between the first old super block 222 and a second old spine block, cutting a third old link 542 at the second switch 212 between a second old super block 226 and the first old spine block 202, cutting a fourth old link 534 at the first switch 210 between the second old super block 226 and the second old spine block 204, adding a third new link 566 at the first switch 210 between the first old super block 222 and the second old spine block 204, adding a fourth new link 564 at the first switch between the first old spine block 202 and the second old super block 226, adding a fifth new link 568 at the second switch 212 between the first old super block 222 and the first old spine block 202, and adding a sixth new link 570 at the second switch 212 between the second old super block 226 and the second old spine block 204. After these cuttings and addings, the links may be configured as shown in FIG. 5F.

As shown in FIG. 5G, the link 568 at the second switch 212 between the first old super block 222 and the first spine block 202 may be cut, the link 572 added at the second switch 212 between the first old spine block 202 and the new super block 228, and the link 574 added at the second switch 212 between the first old super block 222 and the new super block 208. The configuration may then be as shown in FIG. 5H, with one and only one link at each port 500A, 502A, 504A, 506A, 508A, 520A, 522A, 524A, 526A, 528A, 500B, 502B, 504B, 506B, 508B, 520B, 522B, 524B, 526B, 528B, within the switches 210, 212, and two links to each block 200, 202, 204, 206, 208, 220, 222, 224, 226, 228.

Figure 6:
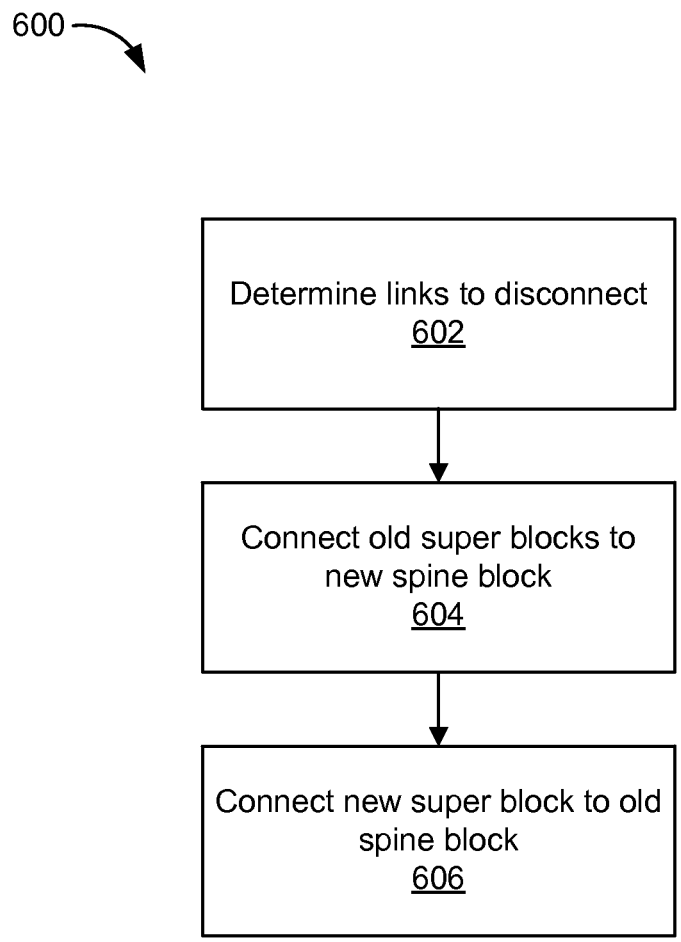
FIG. 6 is a flowchart showing a method according to an example implementation.

FIG. 6 is a flowchart showing a method 600 according to an example implementation. The method 600 may include determining which links connecting old super blocks to old spine blocks via a plurality of Optical Circuit Switches (OCSs) in a network to disconnect to accommodate at least one new super block and at least one new spine block being added to a switching network, the determining including determining a maximum of m links per OCS to disconnect (602). The method 600 may also include connecting the old super blocks to the at least one new spine block via the OCSs associated with the links to be disconnected (604). The method 600 may also include connecting the at least one new super block to the old spine blocks via the OCSs associated with the links to be disconnected (606).

According to an example implementation, the method 600 may also include disconnecting the links based on the determining before connecting the old super blocks to the at least one new spine block and before connecting the at least one new super block to the old spine blocks.

According to an example implementation, the determining which links to disconnect may include performing a maximum flow minimum cut algorithm.

According to an example implementation, determining which links to disconnect may include minimizing a number of links to be disconnected by performing a maximum flow minimum cut algorithm.

According to an example implementation, the determining which links to disconnect may include maximizing a number of links that will remain connected by performing a maximum flow minimum cut algorithm.

According to an example implementation, the determining may include determining a maximum of one link per OCS to disconnect.

Figure 7:
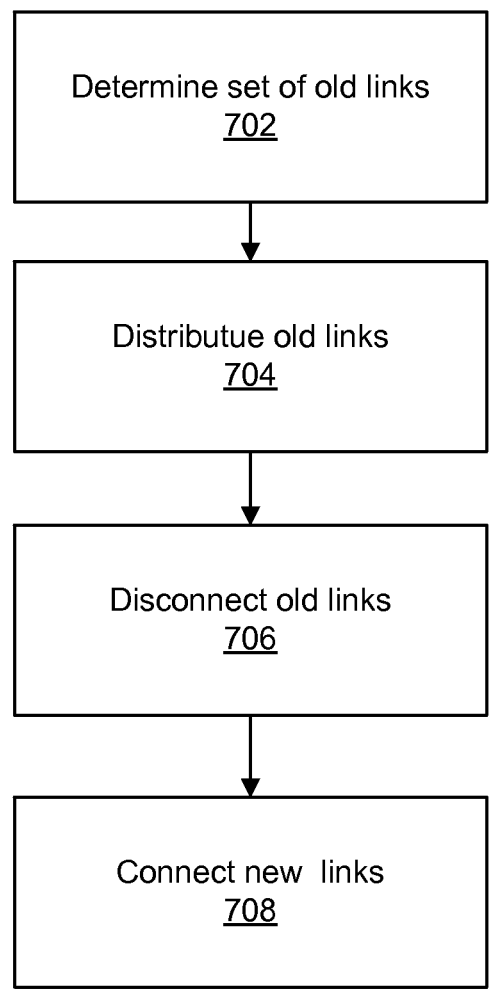
FIG. 7 is a flowchart showing a method according to an example implementation.

FIG. 7 is a flowchart showing a method 700 according to an example implementation. The method 700 may include determining a set of old links between old super blocks and old spine blocks to be disconnected to accommodate new links between the old super blocks and a new spine block and between the old spine blocks and a new super block, the links being routed through switches (702). The method 700 may also include distributing the old links to be disconnected by assigning the old links to be disconnected to the switches with a maximum of m disconnected links per switch (704). The method 700 may also include disconnecting the determined old links at the assigned switches (706). The method 700 may also include connecting the new links between the old super blocks and the new spine block and between the old spine block and the new super block through the switches to which the disconnected old links were assigned (708).

According to an example implementation, the switches may include Optical Circuit Switches.

According to an example implementation, the distributing the old links may include distributing the old links to be disconnected by assigning the old links to be disconnected to the switches with a maximum of one disconnected link per switch.

According to an example implementation, a first old link to be disconnected between a first old super block and a first old spine block may be assigned to a first switch, and a second old link to be disconnected between the first old super block and the first old spine block may be assigned to a second switch.

According to an example implementation, the distributing the old links to be disconnected includes assigning the first old link to be disconnected to the first switch based on a third old link to be disconnected being assigned to a third switch, the third old link being between a second old super block and a second old spine block and being assigned to the third switch.

Figure 8:
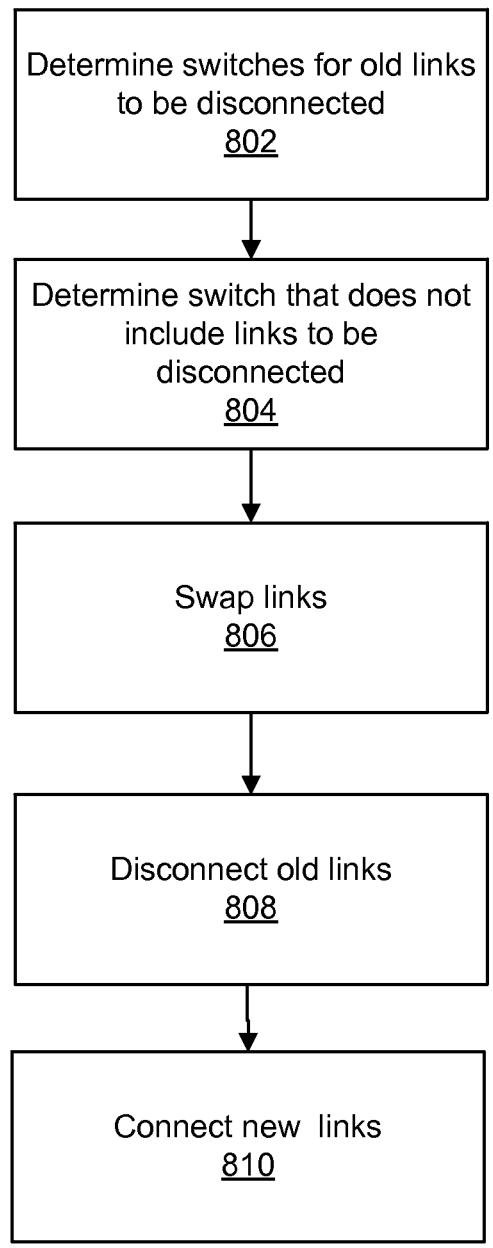
FIG. 8 is a flowchart showing a method according to an example implementation.

FIG. 8 is a flowchart showing a method 800 according to an example implementation. The method 800 may include determining that a set of old links, between old spine blocks and old super blocks to be disconnected to accommodate new links between the old super blocks and a new spine block and between the old spine block and a new super block, includes a first old link through a first switch and a second old link through the first switch (802). The method 800 may also include determining a second switch that does not include any links from the set of old links (804). The method 800 may also include swapping the first old link from the first switch to the second switch for a third old link at the second switch that will not be disconnected to accommodate the new links between the old super blocks and the new spine block and between the old spine block and the new super block (806). The method 800 may also include disconnecting the first old link and the second old link (808). The method 800 may also include connecting the new links between the old super blocks and the new spine block and between the old spine block and the new super block through the first switch and the second switch (810).

According to an example implementation, the first switch may include a first Optical Circuit Switch (OCS) and the second switch includes a second OCS.

According to an example implementation, the disconnecting the first old link and the second old link may be performed after swapping the first old link from the first switch to the second switch.

According to an example implementation, the connecting the new links may be performed after disconnecting the first old link and the second old link.

Figure 9:
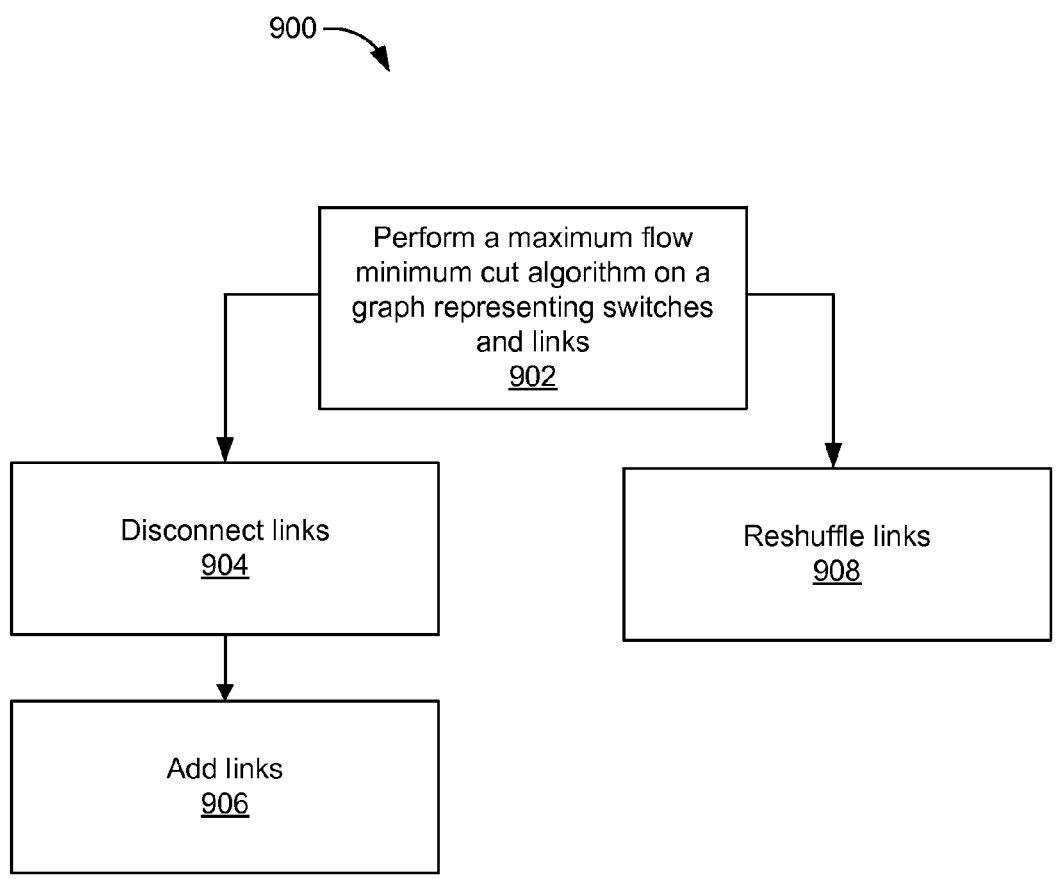
FIG. 9 is a flowchart showing a method according to an example implementation.

FIG. 9 is a flowchart showing a method 900 according to an example implementation. The method 900 may include performing a maximum flow minimum cut algorithm on a graph, the graph representing switches and links between multiple old super blocks and multiple old spine blocks, the links being routed through the multiple switches, to determine whether a lower bound of disconnected links is achievable while linking at least one new super block to the old spine blocks and linking at least one new spine block to the old super blocks (902). If the lower bound is achievable, the method 900 may include disconnect only links to old super blocks and old spine blocks that will be connected to the at least one new spine block or the at least one new super blocks (904) and linking the at least one new super block and the at least one new spine block through the switches which incurred the disconnected links (906). If the lower bound is not achievable, the method 900 may include reshuffling links between switches in which new links will be added and switches in which new links will not be added (908).

According to an example implementation, the switches may include optical circuit switches (OCSs).

According to an example implementation, the switches may each support a maximum of n links per super block and n links per spine block.

According to an example implementation, the switches may each support a maximum of one link per super block and one link per spine block.

According to an example implementation, the method 900 may further include linking the at least one new super block and the at least one new spine block through the switches which incurred the disconnected links after reshuffling the links if the lower bound is not achievable.

Figure 10:
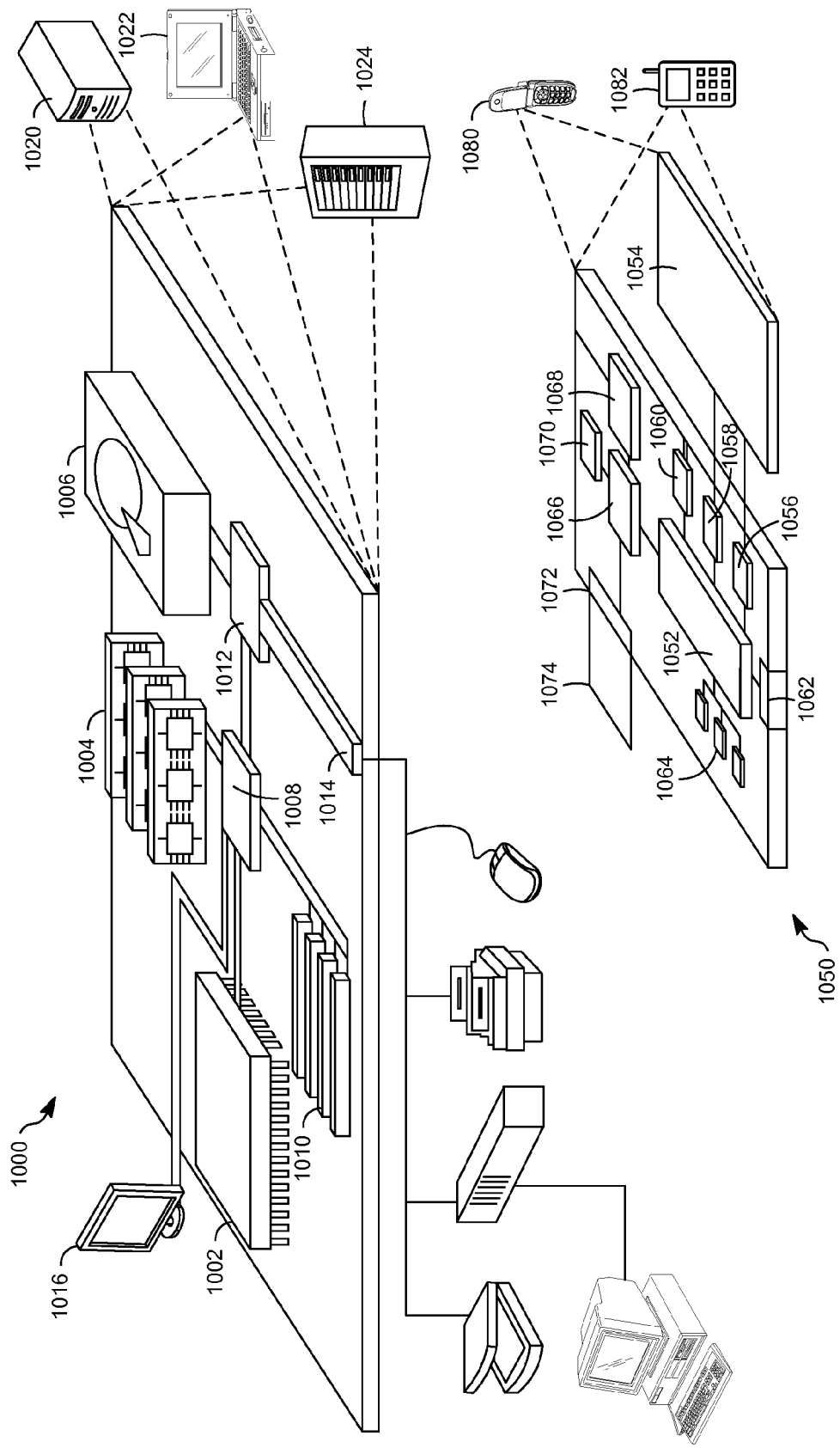
FIG. 10 shows an example of a generic computer device and a generic mobile computer device which may be used with the techniques described herein.

FIG. 10 shows an example of a generic computer device 1000 and a generic mobile computer device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to at least:
   determine which links connecting old super blocks, each old super block comprising a different plurality of interconnected servers, to old spine blocks, each old spine block comprising a different plurality of interconnected routing systems, via a plurality of Optical Circuit Switches (OCSs) in a network to disconnect to accommodate at least one new super block comprising an additional plurality of interconnected servers and at least one new spine block comprising an additional plurality of interconnected routing systems being added to the network, the determining including determining a maximum number of links per OCS to disconnect;
   connect the old super blocks to the at least one new spine block via the OCSs associated with the links to be disconnected; and
   connect the at least one new super block to the old spine blocks via the OCSs associated with the links to be disconnected.

2. The non-transitory computer-readable storage medium of claim 1, wherein the instructions are further configured to cause the computing system to disconnect the links based on the determining before connecting the old super blocks to the at least one new spine block and before connecting the at least one new super block to the old spine blocks.

3. The non-transitory computer-readable storage medium of claim 1, wherein the determining which links to disconnect includes performing a maximum flow minimum cut algorithm.

4. The non-transitory computer-readable storage medium of claim 1, wherein the determining which links to disconnect includes minimizing a number of links to be disconnected by performing a maximum flow minimum cut algorithm.

5. The non-transitory computer-readable storage medium of claim 1, wherein the determining which links to disconnect includes maximizing a number of links that will remain connected by performing a maximum flow minimum cut algorithm.

6. The non-transitory computer-readable storage medium of claim 1, wherein the determining includes determining a maximum of one link per OCS to disconnect.

7. A non-transitory computer-readable storage medium comprising instructions stored thereon that, when executed by at least one processor, are configured to cause a computing system to at least:
   determine a set of old links between old super blocks, each old super block comprising a different plurality of interconnected servers, and old spine blocks, each old spine block comprising a different plurality of interconnected routing systems, to be disconnected to accommodate new links between the old super blocks and a new spine block comprising an additional plurality of interconnected routing systems and between the old spine blocks and a new super block comprising an additional plurality of interconnected servers, the links being routed through switches;
   distribute the old links to be disconnected by assigning the old links to be disconnected to the switches with a maximum number of disconnected links per switch;
   disconnect the determined old links at the assigned switches; and
   connect the new links between the old super blocks and the new spine block and between the old spine block and the new super block through the switches to which the disconnected old links were assigned.

8. The non-transitory computer-readable storage medium of claim 7, wherein the switches include Optical Circuit Switches.

9. The non-transitory computer-readable storage medium of claim 7, wherein the distributing the old links includes distributing the old links to be disconnected by assigning the old links to be disconnected to the switches with a maximum of one disconnected link per switch.

10. The non-transitory computer-readable storage medium of claim 7, wherein:
    a first old link to be disconnected between a first old super block and a first old spine block is assigned to a first switch; and
    a second old link to be disconnected between the first old super block and the first old spine block is assigned to a second switch.

11. The non-transitory computer-readable storage medium of claim 10, wherein the distributing the old links to be disconnected includes assigning the first old link to be disconnected to the first switch based on a third old link to be disconnected being assigned to a third switch, the third old link being between a second old super block and a second old spine block and being assigned to the third switch.

12. A non-transitory computer-readable storage medium comprising instructions stored thereon that, when executed by at least one processor, are configured to cause a computing system to at least:
    determine that a set of old links, between old spine blocks, each old spine block comprising a different plurality of interconnected routing systems, and old super blocks, each old super block comprising a different plurality of interconnected servers, to be disconnected to accommodate new links between the old super blocks and a new spine block comprising an additional plurality of interconnected routing systems and between the old spine block and a new super block comprising an additional plurality of interconnected servers, includes a first old link through a first switch and a second old link through the first switch;
    determine a second switch that does not include any links from the set of old links;
    swap the first old link from the first switch to the second switch for a third old link at the second switch that will not be disconnected to accommodate the new links between the old super blocks and the new spine block and between the old spine block and the new super block;
    disconnect the first old link and the second old link; and
    connect the new links between the old super blocks and the new spine block and between the old spine block and the new super block through the first switch and the second switch.

13. The non-transitory computer-readable storage medium of claim 12, wherein the first switch includes a first Optical Circuit Switch (OCS) and the second switch includes a second OCS.

14. The non-transitory computer-readable storage medium of claim 12, wherein the instructions are configured to cause the computing system to disconnect the first old link and the second old link after swapping the first old link from the first switch to the second switch.

15. The non-transitory computer-readable storage medium of claim 14, wherein the instructions are configured to cause the computing system to connect the new links after disconnecting the first old link and the second old link.

16. A non-transitory computer-readable storage medium comprising instructions stored thereon that, when executed by at least one processor, are configured to cause a computing system to at least:
    perform a maximum flow minimum cut algorithm on a graph, the graph representing switches and links between multiple old super blocks, each old super block comprising a different plurality of interconnected servers, and multiple old spine blocks, each old spine block comprising a different plurality of interconnected routing systems, the links being routed through the multiple switches, to determine whether a lower bound of disconnected links is achievable while linking at least one new super block comprising an additional plurality of interconnected servers to the old spine blocks and linking at least one new spine block comprising an additional plurality of interconnected routing systems to the old super blocks;
    if the lower bound is achievable, disconnect only links to old super blocks and old spine blocks that will be connected to the at least one new spine block or the at least one new super blocks;
    if the lower bound is achievable, link the at least one new super block and the at least one new spine block through the switches which incurred the disconnected links; and if the lower bound is not achievable, reshuffle links between switches in which new links will be added and switches in which new links will not be added.

17. The non-transitory computer-readable storage medium of claim 16, wherein the switches include optical circuit switches (OCSs).

18. The non-transitory computer-readable storage medium of claim 16, wherein the switches each support the same number of links per super block and links per spine block.

19. The non-transitory computer-readable storage medium of claim 16, wherein the switches can each support a maximum of one link per super block and one link per spine block.

20. The non-transitory computer-readable storage medium of claim 16, wherein the instructions are further configured to cause the computing system to link the at least one new super block and the at least one new spine block through the switches which incurred the disconnected links after reshuffling the links if the lower bound is not achievable.

* * * * *